(12) United States Patent
Arnold et al.

(10) Patent No.: US 9,166,926 B2
(45) Date of Patent: **\*Oct. 20, 2015**

(54) METHOD AND ARRANGEMENT FOR SUPPRESSING DUPLICATE NETWORK RESOURCES

(71) Applicant: Apple Inc., Cupertino, CA (US)

(72) Inventors: Kevin Arnold, Los Gatos, CA (US); David M. O'Rourke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,954

(22) Filed: Aug. 19, 2014

(65) Prior Publication Data

US 2014/0365663 A1    Dec. 11, 2014

Related U.S. Application Data

(63) Continuation of application No. 13/742,766, filed on Jan. 16, 2013, now Pat. No. 8,825,868, which is a continuation of application No. 12/758,796, filed on Apr. 12, 2010, now Pat. No. 8,392,570, which is a continuation of application No. 10/141,520, filed on May 6, 2002, now Pat. No. 7,747,747.

(51) Int. Cl.
*G06F 15/16* (2006.01)
*H04L 12/911* (2013.01)
*H04L 29/08* (2006.01)
*H04L 12/24* (2006.01)

(52) U.S. Cl.
CPC .......... *H04L 47/82* (2013.01); *H04L 29/08153* (2013.01); *H04L 41/26* (2013.01); *H04L 41/5058* (2013.01)

(58) Field of Classification Search
USPC ................... 709/226, 223, 229, 230
See application file for complete search history.

(56) References Cited

U.S. PATENT DOCUMENTS

| | | |
|---|---|---|
| 5,121,382 A | 6/1992 | Yang et al. |
| 5,247,620 A | 9/1993 | Fukuzawa et al. |
| 5,283,571 A | 2/1994 | Yang et al. |
| 5,493,569 A | 2/1996 | Buchholz et al. |
| 5,559,959 A | 9/1996 | Foglar |

(Continued)

OTHER PUBLICATIONS

Response to Office Action in U.S. Appl. No. 10/141,520 issued Jun. 13, 2002 mailed Nov. 13, 2002, pp. 1-5.

(Continued)

*Primary Examiner* — Lan-Dai T Truong
(74) *Attorney, Agent, or Firm* — Meyertons, Hood, Kivlin, Kowert & Goetzel, P.C.

(57) ABSTRACT

A duplicate suppression protocol is introduced in order to suppress duplicate entries from appearing in a list of available network resources. With the duplicate suppression protocol of the present invention, a computer that wishes to query for network resources also asks for duplicate suppression information from the responding network resources. The duplicate suppression information for a particular network resource specifies identifiers associated with that network resource for various protocols. Thus, if a particular network resource responds to more than one network resource request from a single requesting entity, that requesting entity will be able to locate duplicate network resource information. Thus, a single unified list of network resources available for various different protocols may be presented with all duplicate network resources removed.

20 Claims, 4 Drawing Sheets

(56) References Cited

U.S. PATENT DOCUMENTS

| | | |
|---|---|---|
| 5,586,117 A | 12/1996 | Edem et al. |
| 5,671,215 A | 9/1997 | Foglar |
| 5,724,510 A | 3/1998 | Arndt et al. |
| 5,740,738 A | 4/1998 | Niemiro |
| 5,875,186 A | 2/1999 | Belanger et al. |
| 5,968,137 A | 10/1999 | Ferraiolo et al. |
| 6,061,368 A | 5/2000 | Hitzelberger |
| 6,131,809 A | 10/2000 | Drescher et al. |
| 6,147,976 A | 11/2000 | Shand et al. |
| 6,161,198 A | 12/2000 | Hill et al. |
| 6,167,051 A | 12/2000 | Nagami et al. |
| 6,167,445 A | 12/2000 | Gai et al. |
| 6,182,142 B1 | 1/2001 | Win et al. |
| 6,212,521 B1 | 4/2001 | Minami et al. |
| 6,292,267 B1 | 9/2001 | Mori et al. |
| 6,308,205 B1 | 10/2001 | Carcerano et al. |
| 6,446,131 B1 | 9/2002 | Khansari et al. |
| 6,470,450 B1 | 10/2002 | Langford et al. |
| 6,496,479 B1 | 12/2002 | Shionozaki |
| 6,570,875 B1 | 5/2003 | Hegde |
| 6,625,145 B1 | 9/2003 | Winell |
| 6,625,164 B1 | 9/2003 | Lioy et al. |
| 6,658,476 B1 | 12/2003 | Van |
| 6,662,213 B1 | 12/2003 | Xie et al. |
| 6,792,466 B1 | 9/2004 | Saulpaugh et al. |
| 6,823,453 B1 | 11/2004 | Hagerman |
| 6,847,995 B1 | 1/2005 | Hubbard et al. |
| 6,882,624 B1 | 4/2005 | Ma |
| 6,895,441 B1 | 5/2005 | Shabtay et al. |
| 6,925,079 B2 | 8/2005 | Matsukawa |
| 6,928,483 B1 | 8/2005 | Cain |
| 6,944,674 B2 | 9/2005 | Frelechoux et al. |
| 7,010,585 B2 | 3/2006 | Asami |
| 7,031,985 B1 | 4/2006 | Pecheny |
| 7,032,029 B1 | 4/2006 | Tanzman et al. |
| 7,075,897 B2 | 7/2006 | Uematsu |
| 7,151,772 B1 | 12/2006 | Kalmanek, Jr. et al. |
| 7,200,649 B1 | 4/2007 | Batke et al. |
| 8,825,868 B2 | 9/2014 | Arnold et al. |
| 2001/0017857 A1 | 8/2001 | Matsukawa |
| 2002/0052968 A1 | 5/2002 | Bonefas et al. |
| 2002/0093967 A1 | 7/2002 | Perlman et al. |
| 2002/0099806 A1 | 7/2002 | Balsamo et al. |
| 2002/0124094 A1 | 9/2002 | Chang et al. |
| 2002/0150093 A1 | 10/2002 | Ott et al. |
| 2003/0026230 A1 | 2/2003 | Ibanez et al. |
| 2003/0028896 A1 | 2/2003 | Swart et al. |
| 2003/0037178 A1 | 2/2003 | Vessey et al. |
| 2003/0097425 A1 | 5/2003 | Chen |
| 2003/0177252 A1 | 9/2003 | Krichevski et al. |
| 2004/0236851 A1 | 11/2004 | Kuan et al. |
| 2004/0249909 A1 | 12/2004 | Matsukura |
| 2008/0092228 A1 | 4/2008 | Baum |
| 2008/0184207 A1 | 7/2008 | Motoyama et al. |
| 2011/0024163 A1 | 2/2011 | Goto et al. |

OTHER PUBLICATIONS

U.S. Appl. No. 10/141,520, entitled "Method and Arrangement for Suppressing Duplicate Network Resources", by Kevin Arnold and David O'Rourke, filed May 6, 2002, pp. 1-13.
Office Action in U.S. Appl. No. 10/141,520 issued Dec. 29, 2009, pp. 1-12.
Office Action in U.S. Appl. No. 10/141,520 issued Sep. 29, 2008, pp. 1-15.
Office Action in U.S. Appl. No. 10/141,520 issued Jul. 31, 2007, pp. 1-12.
Office Action in U.S. Appl. No. 10/141,520 issued Jan. 29, 2007, pp. 1-10.
Office Action in U.S. Appl. No. 10/141,520 issued Aug. 11, 2006, pp. 1-11.
Office Action in U.S. Appl. No. 10/141,520 issued Jan. 30, 2006, pp. 1-8.
Office Action in U.S. Appl. No. 10/141,520 issued Jun. 16, 2005, pp. 1-7.
Response to Office Action in U.S. Appl. No. 10/141,520 issued Dec. 29, 2009 mailed Mar. 29, 2010, pp. 1-14.
Response to Office Action in U.S. Appl. No. 10/141,520 issued Sep. 29, 2008 mailed Apr. 9, 2009, pp. 1-10.
Response to Office Action in U.S. Appl. No. 10/141,520 issued Sep. 29, 2008 mailed Jan. 29, 2009, pp. 1-23.
Response to Office Action in U.S. Appl. No. 10/141,520 issued Jul. 31, 2007 mailed May 12, 2008, pp. 1-8.
Response to Office Action in U.S. Appl. No. 10/141,520 issued Jul. 31, 2007 mailed Mar. 31, 2008, pp. 1-2.
Response to Office Action in U.S. Appl. No. 10/141,520 issued Jul. 31, 2007 mailed Nov. 30, 2007, pp. 1-2.
Response to Office Action in U.S. Appl. No. 10/141,520 issued Jan. 29, 2007 mailed Apr. 30, 2007, pp. 1-9.
Response to Office Action in U.S. Appl. No. 10/141,520 issued Aug. 11, 2006, mailed Nov. 13, 2006, pp. 1-13.
Response to Office Action in U.S. Appl. No. 10/141,520 issued Jan. 20, 2006 mailed May 1, 2006, pp. 1-2.
Response to Office Action in U.S. Appl. No. 10/141,520 issued Jun. 16, 2005 mailed Oct. 17, 2005, pp. 1-7.

METHOD AND ARRANGEMENT FOR SUPPRESSING DUPLICATE NETWORK RESOURCES

PRIORITY CLAIM

This application is a continuation of U.S. patent application Ser. No. 13/742,766, filed Jan. 16, 2013, and entitled "Method and Arrangement for Suppressing Duplicate Network Resources," which is a continuation of U.S. patent application Ser. No. 12/758,796, filed on Apr. 12, 2010, also entitled "Method and Arrangement for Suppressing Duplicate Network Resources", (now U.S. Pat. No. 8,392,570), which is a continuation of U.S. patent application Ser. No. 10/141,520, filed on May 6, 2002, also entitled "Method and Arrangement for Suppressing Duplicate Network Resources", (now U.S. Pat. No. 7,747,747). Those prior patent applications are hereby incorporated by reference in their entireties as though fully and completely set forth herein.

FIELD OF THE INVENTION

The present invention relates to the field of computer networking. In particular the present invention discloses a method and arrangement for discovering computer network resources and eliminating duplicate computer resources.

BACKGROUND OF THE INVENTION

To more efficiently use computer resources, most computer systems have been coupled into computer networks. A computer network allows the individual computer systems coupled to the computer network to share resources such as printers, modems, fax services, and Internet gateways. But more importantly, computer networks allow the different computer systems to share data using a number of different file sharing protocols such as File Transfer Protocol (FTP), Network File System (NFS), Windows Server Message Block (SMB), and Apple File Protocol (AFP).

In order to share computer files and other network resources, a computer system on a computer network must be informed about the various available network resources. Ideally, the computer network resources will be easily identified and displayed in an intuitive manner.

SUMMARY OF THE INVENTION

The present invention introduces a duplicate suppression protocol. With the duplicate suppression protocol of the present invention, a computer the wishes to query for network resources also asks for duplicate suppression information from the responding network resources. The duplicate suppression information for a particular network resource specifies identifiers associated with that network resources for various protocols. Thus, if a particular network resource responds to more than one network resource request from a single requesting entity, that requesting entity will be able to locate duplicate network resource information. Thus, a single unified list of network resources available for various different protocols may be presented with all duplicate network resources removed.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

A method and apparatus for discovering computer network resources and eliminating duplicate computer resources is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the Apple Macintosh Operating System. However, the same techniques can easily be applied to other types of Computer operating systems. Furthermore, the steps performed by the method herein described may be implemented with computer instructions that are stored on any recordable media such as CD-ROMs, DVD-ROMs, or magnetic disks.

Computer Networks

Figure 1:
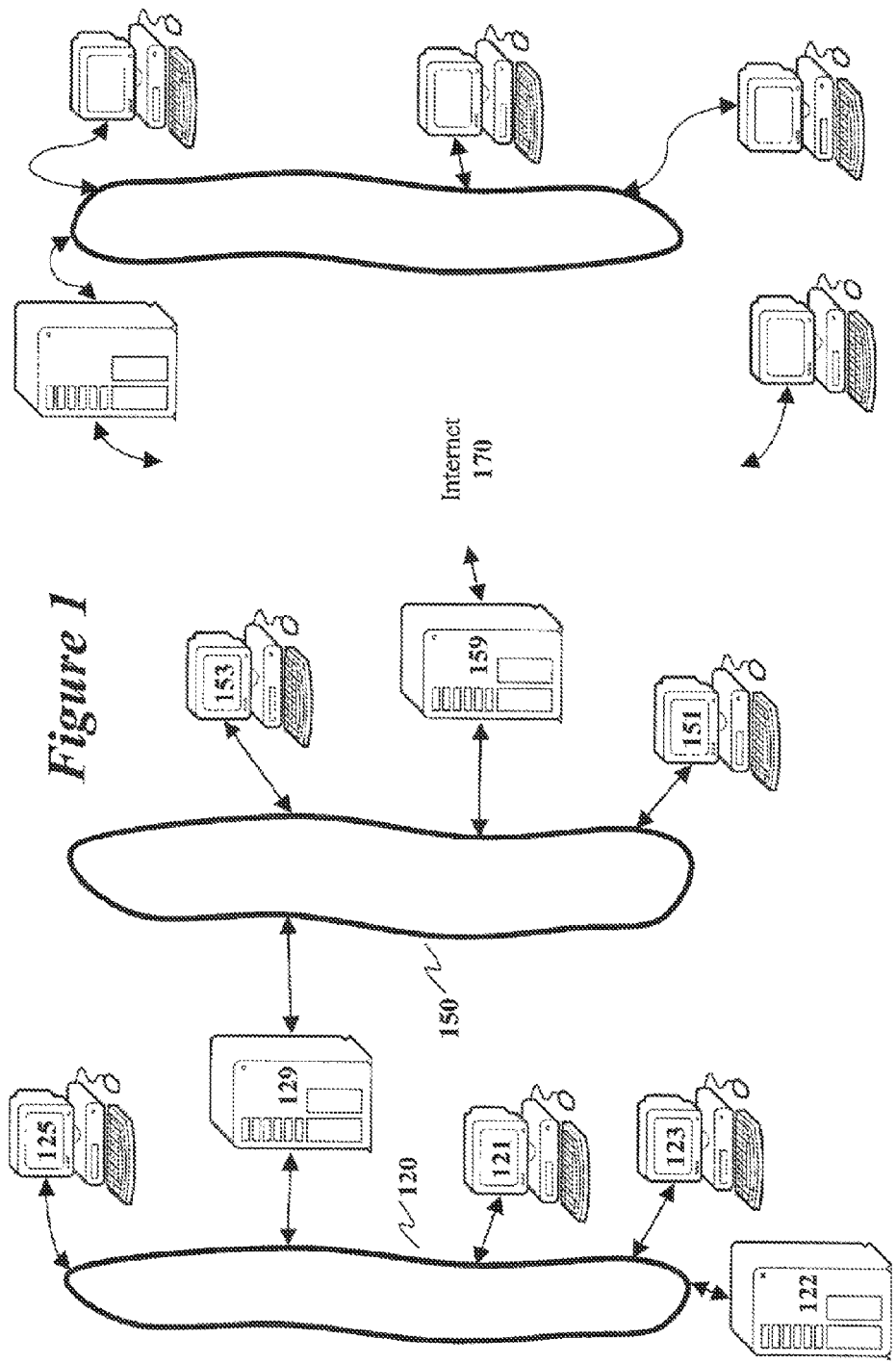
FIG. 1 illustrates a block diagram of computer systems coupled to three different Local Area Networks (LANs) and the global Internet.

FIG. 1 illustrates a block diagram of various computer systems coupled to various computer networks. On the left side of FIG. 1, three computer systems 121, 123, and 125 are coupled to a first Local Area Network (LAN) 120. The LAN 120 may comprise any one of many different network media types such as 100Base-T Ethernet or Thin-net Ethernet. LAN 120 may actually be a wireless network such as IEEE 802.11b. By communicating across LAN 120 with a common protocol such as TCP/IP, computer systems 121, 123 and 125 may share computer files and other resources.

A network gateway or router 129 couples LAN 120 with another LAN 150. In this manner, computer systems 121, 123 and 125 on LAN 120 may also share computer files and other resources available on LAN 150. For example, computer system 121 may access a file on computer system 151 on LAN 150. A firewall 159 couples LAN 150 to the global Internet 170. Thus, computer systems 151 and 153 can access the Internet 170 through firewall 159. Similarly, computer systems 121, 123 and 125 may 5 access the Internet 170 through router 129 and firewall 159.

Service Location

In order for a computer system to access a resource on a computer network, the computer system must have some type of address of the resource. There are three main systems of providing resource addresses to a computer on a network.
Preconfiguration One method of informing a computer coupled to a network about the available services is to preconfigure the computer with the addresses of various computer resources. This technique is often accomplished by creating a "hosts" table that lists the names and addresses of other known hosts systems. For example, computer system 121 may be preconfigured with a hosts table that informs computer system 121 about computer system 123, computer systems 125, and server system 122 on the Local Area Network 120.

The preconfiguration technique is often used to provide a computer system with the network address of an available name server. The name server provides a service that allows the computer system to resolve alphanumeric names into network addresses. For example, computer systems 121, 123 and 125 maybe pre configured to use server 122 as a name server.

Preconfiguring computer systems with the addresses of other hosts is an extremely labor intensive administrative burden. For example, any time a new host is added or deleted to the local network, every other computer system must have its host table updated. Thus, most computer network systems do not rely upon preconfiguration as the only system of specifying network resources.

User Configuration

Another method of informing a computer system about available network resources is to have the user enter the addresses of network resources. To simplify entry, the network resources may be given alphanumeric names and the alphanumeric names may be translated into network addresses using a name server. Referring back to FIG. 1, a user of computer system 123 may enter in a name of a network resource. If necessary, computer system 123 may resolve the entered name using a name server such as name server 122.

The Internet has a unified Domain Name Service (DNS) that allows the owner of a top-level domain (TLD) to globally define the network address of any name within that top-level domain. For example, Apple Computer Inc. owns the "apple.com" top-level domain such that Apple Computer may globally specify the network address of "Kevin.apple.com". In this manner, any computer system coupled to the Internet requests the network address of "Kevin.apple.com" will receive the network address assigned by Apple Computer.

Allowing user configuration allows for new network resources to be easily added to a computer network at any time. For example, a new web site may be created and its name and address entered into the Domain Name Service (DNS). Then, when a user enters the Uniform Resource Locator (URL) associated with the web site (its name) into a browser, the browser will access a DNS server to locate the address of the new web site.

Although user configuration allows for relatively easy addition of new network resources, the system puts a burden upon the user. Furthermore, the user must properly enter the name of a new computer network resource or the use will not be able to locate the resource. Thus, if the user enters the network resource name incorrectly or does not know the name of a desired computer network resource, the user will not be able to access the desired computer network resource.

Automatic Network Resource Location

To simplify the location of network resources most network protocols have adopted some type of automatic resource location system. In a typical automatic network resource location system, a client computer system broadcasts a request message that asks for information about the available network resources. Network resources that receive the broadcast request respond with a message that informs the requesting client computer system about the available network resource. Thus, with an automatic resource location system, a user may easily locate the available network resources.

Most computer network protocols have now implemented some type of automatic resource location system. For example, the TCP/IP protocol used by the global Internet and used in many internal "intranets" (internal networks built using Internet protocols) uses an automatic resource location system known as Service Location Protocol (SLP). The Service Location Protocol is one method of locating TCP/IP-based network resources on a TCP/IP intranet. Detailed information on SLP can be found in the Internet Engineering Task Force (IETF) Request For Comments (RFC) document number 2608 (simply known as RFC 2608). Apple Computer's AppleTalk protocol has long provided a very intuitive automatic network resource location system known as Name Binding Protocol (NBP).

The operation of a typical automatic resource location system can be provided with reference to FIG. 1. Referring to FIG. 1, computer system 121 may broadcast a network resource request message in search of network resources. Computer systems 123, 125, 151, and 153; and server systems 122 and 159 may respond to the network resource request message with an appropriate response message that specifies their available network resources (file service, printers, etc.).

To limit the number of resources that report, the broadcast request message may limit the scope of the broadcast. For example, in the TCP/IP Service Location Protocol (SLP), the SLP request message may only be broadcast to the local subnet. (Such a limited broadcast can be performed by sending a multicast packet to the local subnet.) Referring again to FIG. 1, computer system 121 may send a network resource request message that is only directed to network nodes on the local subnet defined by Local Area Network 120. In such a case, only computer system 123, computer system 125, and server system 122 will receive the network resource request. Thus, only computer system 123, computer system 125, and server system 122 will respond to the network resource request message with an appropriate response message that specifies their available network resources (file service, printers, etc.).

Resource Duplication

Many different computer network protocols have evolved over time such that most computer networks actually carry multiple different computer network protocols. For example, a local area network that provides computer network services to Apple Macintosh personal computers, Microsoft Windows based personal computers, and UNIX workstations may carry network packets for the AppleTalk File Protocol (APP) often used by Macintosh computer systems, the Windows Server Message Block (SMB) protocol often used by Microsoft Windows-based computer systems, and the Network File System (NFS) used by most UNIX workstations.

To provide maximum flexibility, compatibility, and interoperability, many computer systems now simultaneously support multiple different network communication protocols. For example, a MacOS X based Macintosh computer system may simultaneously support the AppleTalk File Protocol (APP), the Windows Server Message Block (SMB) protocol, and the Network File System (NFS). In this manner just about any other networked computer system will be able to easily communicate with the Macintosh computer system.

A computer system that simultaneously supports multiple network communication protocols that computer system will respond to automatic resource location requests for all of the different network communication protocols that it supports. For example, if a MacOS X based Macintosh computer system receives a Windows SMB-based CIFS request message, a TCP/IP SLP request message, or an AppleTalk NBP request message, then that MacOS X based Macintosh computer system will respond with an appropriate response message in the appropriate protocol. If the MacOS X based Macintosh computer system receives all three of these different network resource request messages, then that Macintosh computer system will send three independent appropriate response messages.

Referring to the example of the previous paragraph, if the three network resource request messages all originated from the same requesting computer system, then that requesting computer system will receive three independent responses from the same Macintosh computer system. Thus, the requesting computer system will seem to "see" three different computer network resources (one for each different network protocol) even though there is really only one independent computer network resource. These duplicate computer network resources unnecessarily confuse the user of the requesting computer system. Even though all three different network resources refer to the same computer node, the fact that three different (but likely similar) network resources are displayed as available may confuse the user.

Resource Duplicate Suppression

To prevent such network resource duplicates, the present invention introduces a network resource duplicate suppression system. The network resource duplicate suppression system prevents individual computer resources that support multiple protocols from appearing many times in a list of available network resources (once for each different supported protocol).

The network resource duplicate suppression system of the present invention operates by first having a requesting computer system broadcast a duplicate suppression request packet. Computer network nodes that receive the duplicate suppression request packet and support more than one protocol should respond with an appropriate duplicate suppression response packet. The duplicate suppression response packet specifies identifiers for the responding computer system in the various different network protocols. The requesting computer system then uses the information in the duplicate suppression response packet to eliminate duplicate computer network resources.

Figure 2:
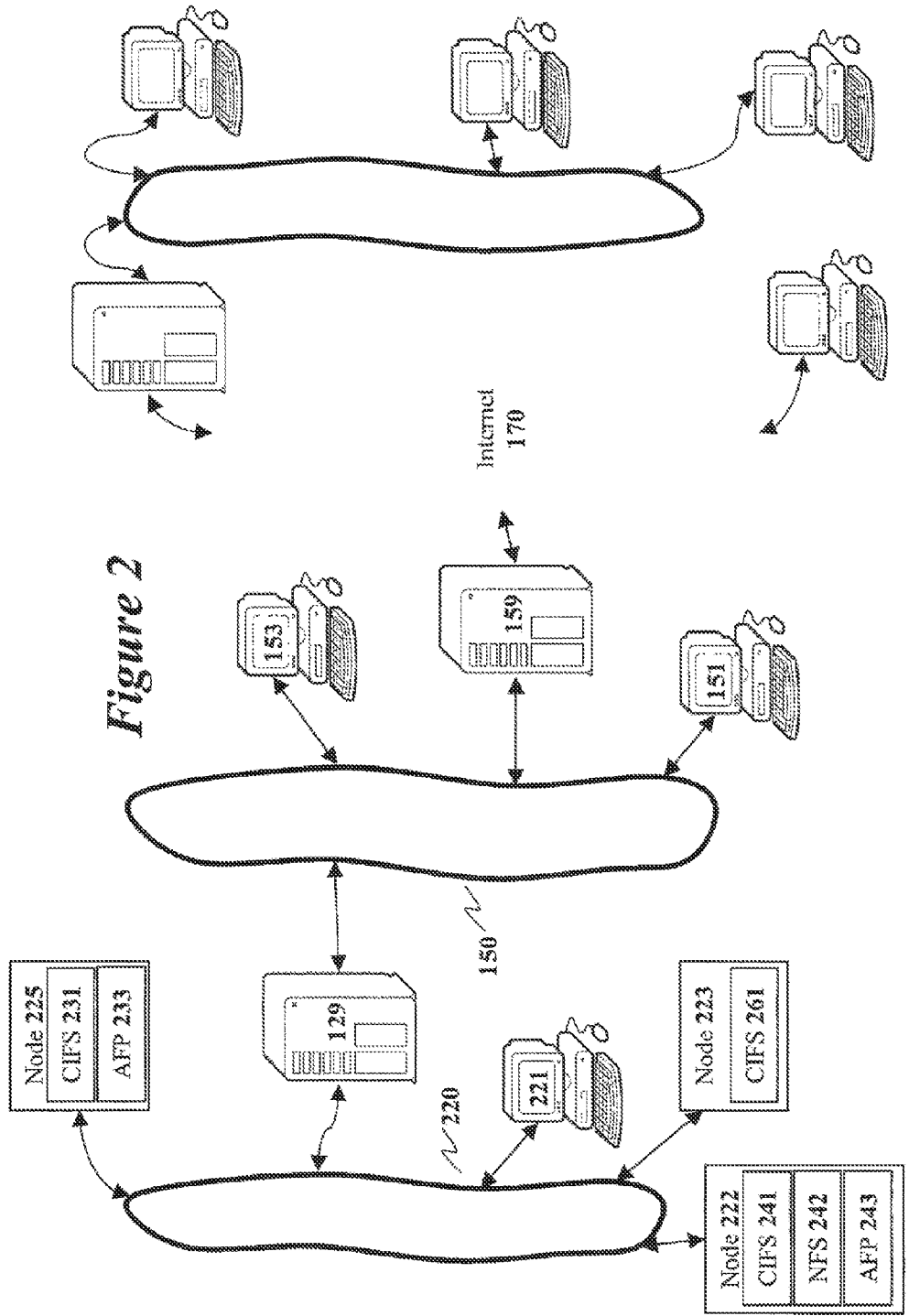
FIG. 2 illustrates the computer network diagram of FIG. 1 wherein a few of the computer systems have been replaced with block diagrams.
Figure 3:
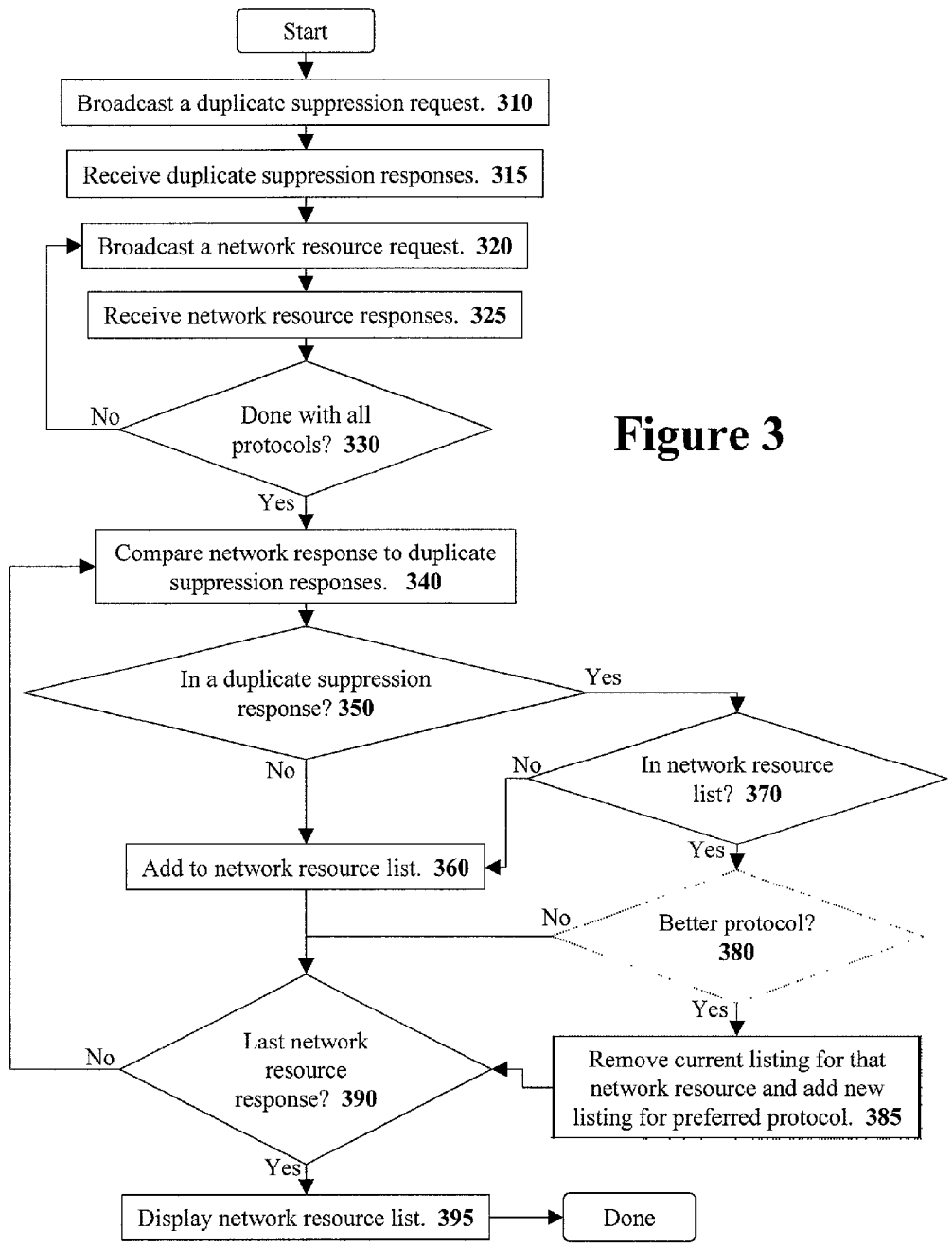
FIG. 3 illustrates a flow diagram describing how duplicate network resources may be removed using the teachings of the present invention.

To best illustrate the network resource duplicate suppression system, an example will be provided with reference to FIG. 2 and FIG. 3. FIG. 2 illustrates the network diagram of FIG. 1 where computer systems 123, 125, and 122 have been replaced with computer node block diagrams 223, 225, and 222, respectively. The computer system nodes 223, 225, and 222 illustrate the supported protocols of those units. For example, computer server system 122 has been replaced with node 22 that supports the Windows CIFS protocol 241, the TCP/IP NFS protocol 242, and the AppleTalk File Protocol (AFP) 243. FIG. 3 illustrates a list of steps used to locate local network resources while eliminating duplicate network resources.

Referring to FIGS. 2 and 3, computer system 221 first broadcasts a duplicate suppression request packet at step 310. In one embodiment, this is a limited broadcast such as a broadcast only to nodes on LAN 220. Computer system nodes 223, 225, and 222 each receive the limited broadcast of the duplicate suppression request packet. Each system that receives the duplicate suppression request packet should respond with an appropriate duplicate suppression response. (However, as will be seen, a duplicate suppression response is not always required.)

Computer node 223 only supports one protocol, the Windows CIFS protocol 261. Since computer node 223 only supports one protocol, it will only respond to one automatic network resource request such that it will not create duplicate network resource responses. Since computer system node 223 will not create duplicate network resource responses, it does not need to send a duplicate suppression response in response to the duplicate suppression request. In this manner, the duplicate suppression system remains backward compatible with existing single protocol computer systems that are not aware of the duplicate suppression protocol. However, a system that only currently supports a single protocol, such as computer node 223, may elect to send a duplicate response anyway.

Computer server node 222 supports the Windows CIFS protocol 241, the Network File System protocol 242, and the AppleTalk File Protocol 233. Since network resource requests will independently discover all three of these different protocols, computer server node 222 should respond to the duplicate suppression request from node 221 with a duplicate suppression response message.

In one embodiment, the duplicate suppression response message comprises a list of identifiers of the computer node for the various different protocols in a well-known order. For example, the duplicate suppression response message may contain "Karnold; Kev'sPowerbook; afp://karnold.apple.com/; karnold.apple.com" wherein "Karnold" is the node identifier for a Windows SMB node, "Kev'sPowerbook" is the node identifier for an AppleTalk File Protocol node, "afp://karnold.apple.com/" is an SLP identifier, and "karnold.apple.com" is a multicast-DNS (mDNS) identifier. (Multicast-DNS is a way of using familiar DNS programming interfaces, packet formats and operating semantics, in a small network where no conventional DNS server has been installed.)

In one embodiment, the responding systems only send a duplicate suppression response message that contains only a hash of the identifier. For example, instead of sending a response message containing "Karnold; Kev'sPowerbook; afp://karnold.apple.com/; karnold.apple.com", the duplicate suppression response message may contain "23433; 62485; 14753; 30732;" where the four numerical values are hashes of the identifier strings.

Referring again to FIG. 2, computer node 225 supports both the Windows CIFS protocol 231 and the AppleTalk File Protocol 233. Thus, computer node 225 responds with a duplicate suppression response message specifying the identifiers of those two protocols. Identifiers associated with unsupported protocols may also be sent but those identifiers will not be used.

Referring back to FIG. 3, the requesting computer system (computer system 221 of FIG. 2) receives the duplicate suppression response messages at step 315. Requesting computer system 221 stores the received duplicate suppression response messages for later use.

Next, at step 320, requesting computer system 221 broadcasts a network resource request for one of the protocols that it supports. At step 325, computer system 221 receives network resource responses for that protocol. For example, if the network resource request was for the Windows CIFS protocol, then computer node 221 will receive network resource responses from node 222, node 223, and node 225.

At step 330, the system determines if additional protocols are supported by network node 221. If additional network nodes are supported, the system returns to step 320 to broadcast additional network resource requests in another protocol. For example, the system may return to step 320 to broadcast an AppleTalk resource request. After broadcasting such a request, the node 221 will receive AppleTalk resource response messages from nodes 222 and 225.

After requesting resources for all the supported protocols, the system proceeds to step 340 to begin eliminating duplicates. At step 340, computer node 221 compares a first network response message with the duplicate suppression responses received. If an identifier in the network response message is not in a duplicate suppression response, as tested in step 350, the system adds the information from that network response message into a list of available network resources at step 360. This completes the processing of that first network response message.

If an identifier in the network response message is in a duplicate suppression response, then the system proceeds to step 370 where the system tests if that network resource has already been added to the network resource list. If that network resource has not yet been added to the network resource list, then that network resource is added at step 360. However, if the network resource has already been added, then the system does not need to add that network resource again since such an entry would be a duplicate. Thus, the system could proceed directly to step 390.

However, in one embodiment, the system may instead determine at step 380 if the network resource response is associated with a better protocol than the protocol already associated with the network resource is the network resource list. If this duplicate network resource response is associated with a better (or preferred) protocol, then the system may proceed to step 385 where the current listing for the network resource is removed and a new network resource listing is added for the preferred protocol. Since steps 380 and 385 are optional, those steps are illustrated with dotted lines.

After completing the processing of the first network resource response, the system proceeds to step 390. At step 390, the system determines if the final network resource response message has been processed. If there are additional network resource response messages to process then the system proceeds back to step 340 to process the next network resource response message.

Figure 4:
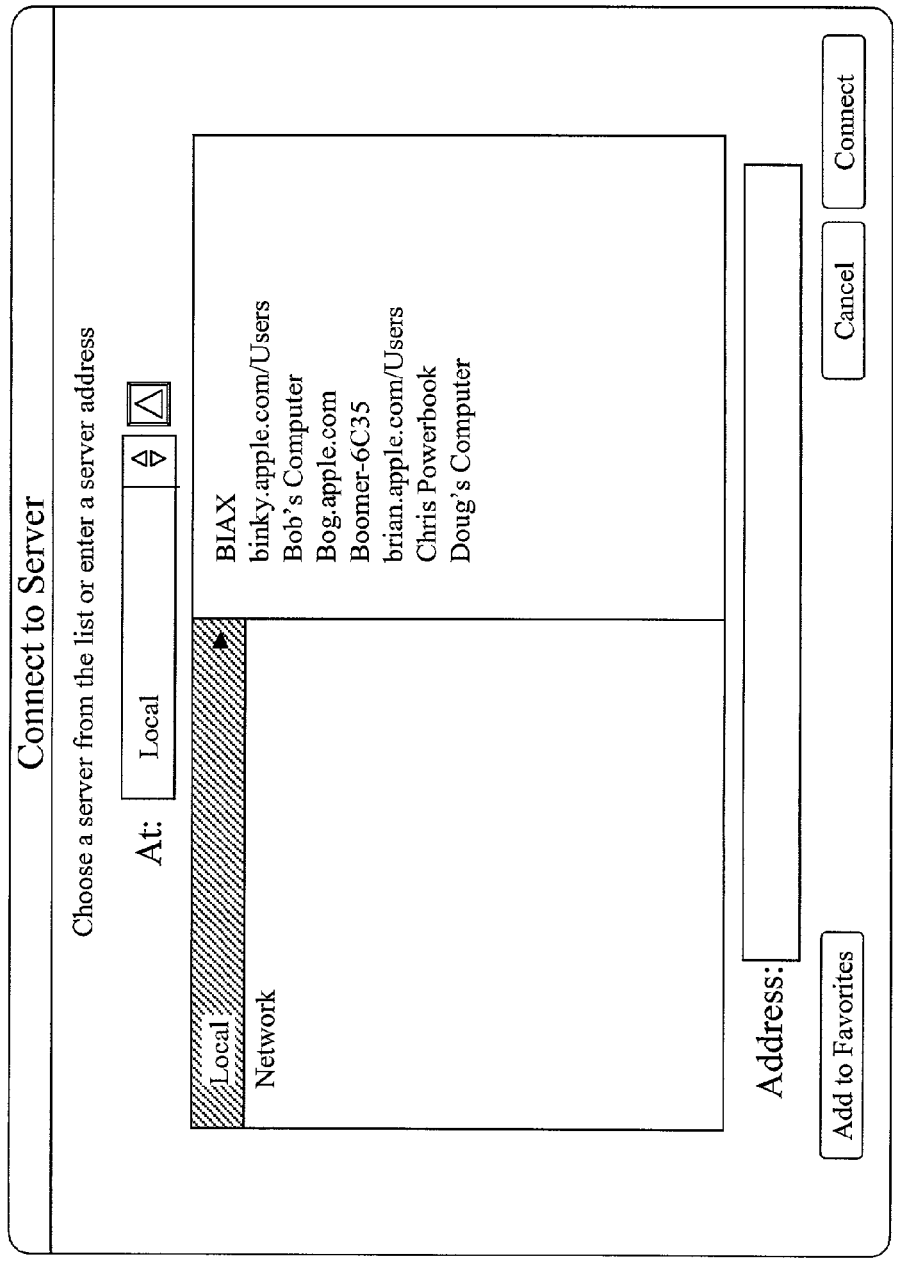
FIG. 4 illustrates one possible screen display of network resources wherein duplicates have been removed.

Once all the network resource response messages have been processed, then computer node 221 displays the network resource list at step 395. FIG. 4 illustrates an example of a screen display of a final network resource list that may be displayed after a computer system has sent out requests to obtain all the "local" network resources and then removed the duplicates. The right-hand column lists a number of different network resources that may use different protocols but the resources are all listed together in one simple list. Furthermore, the network resources listed in the right-hand column may be able to operate with more than one different protocol, yet only one listing is provided for each unique network resource. The "network" listing will allow a user to locate network resources for a specifically selected network protocol.

FIG. 3 illustrates one possible embodiment. In a more optimized embodiment, the duplicate suppression request and the all the automatic network resource requests are performed at the same time. Thus, the discovery of duplicate suppression information and network resources performed in steps 310 to 330 may be performed in parallel. The creation of a network resource list commences when the duplicate suppression search is completed. The creation of a network resource list then begins. The network resource list may be created while network resource responses are still being received. As the network resource list is being created, the steps to prevent duplicate entries and replace existing entries described in steps 340 to 390 are performed.

The foregoing has described a method and arrangement for discovering computer network resources and eliminating duplicate computer resources. It is contemplated that changes and modifications may be made by one of ordinary skill in the art, to the materials and arrangements of elements of the present invention without departing from the scope of the invention.

What is claimed is:

1. A computer system, comprising:
communication circuitry configured to communicate with one or more network nodes via a local area network; and
a processor coupled to the communication circuitry;
wherein the communication circuitry and the processor are configured to:
receive, from a first network node of the one or more network nodes, a duplicate suppression message;
receive, from the first network node, first and second network resource messages, the first network resource message identifying the first network node in a first protocol and the second network resource message identifying the first network node in a second protocol;
compare each of the first and the second network resource messages to the duplicate suppression message to determine that the first network resource message and the second network resource message are from the same network node; and
store, in a list of network resources, a single entry for the first network node based on at least one of the first and second network resource messages.

2. The computer system of claim 1, wherein the communication circuitry and the processor are further configured to send a duplicate suppression request prior to receiving the duplicate suppression message.

3. The computer system of claim 2, wherein the sending the duplicate suppression request comprises broadcasting the duplicate suppression request via the local area network.

4. The computer system of claim 3, wherein the broadcasting is limited to the local area network.

5. The computer system of claim 1, wherein the communication circuitry and the processor are further configured to broadcast a first network resource request for the first protocol prior to receiving the first network resource message.

6. The computer system of claim 5, wherein the communication circuitry and the processor are further configured to broadcast a second network resource request for the second protocol prior to receiving the second network resource message.

7. The computer system of claim 1, wherein the duplicate suppression message comprises hashes of identifiers for the first network node in the first and second protocols.

8. A computer system, comprising:
communication circuitry configured to communicate with one or more network nodes via a local area network; and
a processor coupled to the communication circuitry;
wherein the communication circuitry and the processor are configured to:
receive, from a first network node of the one or more network nodes, a first message that includes a first identifier that identifies the first network node in a first protocol;
receive, from the first network node, a second message that includes a second identifier that identifies the first network node in a second protocol, wherein the second identifier is different from the first identifier;
determine that the first identifier and the second identifier are both identifiers of the first network node;
determine which of the first protocol and the second protocol is a preferred protocol; and
store, in a list of network resources, a single entry for the first network node based on the preferred protocol.

9. The computer system of claim 8, wherein the list of network resources maintains, for the single entry, a set of associated protocols based on the first and second messages.

10. The computer system of claim 8, wherein the communication circuitry and the processor are further configured to store, before determining which protocol is preferred, the first identifier as an entry for the network node in the list of network resources after receiving the first message.

11. The computer system of claim 8, wherein the communication circuitry and the processor are further configured to:
receive, from the network node, a third message that includes a third, different identifier that identifies the first network node in a third protocol; and
determine that the first, second, and third identifiers are all identifiers of the first network node.

12. The computer system of claim 8, wherein the storing the single entry for the first network node based on the preferred protocol comprises removing from the list of network resources an entry for the first network node according to a non-preferred protocol.

13. The computer system of claim 8, wherein the communication circuitry and the processor are further configured to receive, from the first network node, a duplicate suppression message indicating that the first network node has different identifiers in different protocols.

14. The computer system of claim 13, wherein the communication circuitry and the processor are further configured to send a duplicate suppression request prior to receiving the duplicate suppression message.

15. A computer system, comprising:
communication circuitry configured to communicate with one or more network nodes via a local area network; and
a processor coupled to the communication circuitry;
wherein the computer system is configured to:
send a plurality of identifier requests to a plurality of network resources requesting that the network resources provide identifiers for a plurality of different protocols;
receive one or more identifiers from each of the network resources in response to the identifier requests, each identifier associated with a respective network resource for one of the protocols, wherein a first plurality of identifiers is received from a first network resource;
use the first plurality of identifiers to identify the first network resource uniquely; and
provide a single identifier of the one or more identifiers received from each of the other network resources in a list of network resources.

16. The computer system of claim 15, further comprising:
a display screen;
wherein the computer system is further configured to display the list of network resources on the display screen.

17. The computer system of claim 15, wherein at least one of the network resources is a printer.

18. The computer system of claim 15, wherein the first plurality of identifiers comprises a first identifier for the first network resource for a first one of the plurality of different protocols, and a second identifier for the first network resource for a second one of the plurality of different protocols, wherein the second identifier is different than the first identifier.

19. The computer system of claim 18, wherein the single identifier for the first network resource in the list of network resources is an identifier of the first network resource in a preferred protocol.

20. The computer system of claim 15, wherein the computer system is further configured to send a plurality of duplicate suppression requests to the plurality of network resources requesting that each of the network resources provide a duplicate suppression message indicating whether that respective network resource has different identifiers in different protocols.

* * * * *